United States Patent

Krockenberger et al.

Patent Number: 5,807,504
Date of Patent: Sep. 15, 1998

[54] STABILIZER MIXTURE COMPOSED OF CHROMAN DERIVATIVES, ORGANIC PHOSPHITES OR PHOSPHONITES AND AMINES

[75] Inventors: Jürgen Krockenberger, Stuttgart; Wolfgang Goetze, Maxdorf; Hubert Trauth, Dudenhofen; Alexander Aumüller, Neustadt, all of Germany

[73] Assignee: BASF Aktiengesellschaft, Ludwigshafen, Germany

[21] Appl. No.: 693,219

[22] PCT Filed: Feb. 10, 1995

[86] PCT No.: PCT/EP95/00478

§ 371 Date: Aug. 21, 1996

§ 102(e) Date: Aug. 21, 1996

[87] PCT Pub. No.: WO95/23182

PCT Pub. Date: Aug. 31, 1995

[30] Foreign Application Priority Data

Feb. 23, 1994 [DE] Germany ............ 44 05 670.2

[51] Int. Cl.⁶ .................................................. C08K 5/52
[52] U.S. Cl. ........................................ 252/400.24; 524/110
[58] Field of Search ................... 524/110; 252/400.24

[56] References Cited

U.S. PATENT DOCUMENTS 4,806,580  2/1989  Bock et al. ................................ 524/110

Primary Examiner—Johann Richter
Assistant Examiner—Laura L. Stockton
Attorney, Agent, or Firm—Oblon, Spivak, McClelland, Maier & Neustadt, P.C.

[57] ABSTRACT

Stabilizer mixture for organic material, in particular for plastics, comprising (a) one or more chroman derivatives of the general formula I

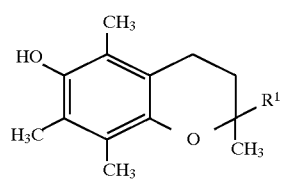

(b) one or more organic phosphites of the general formula II

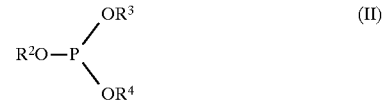

or an organic phosphonite of the formula III

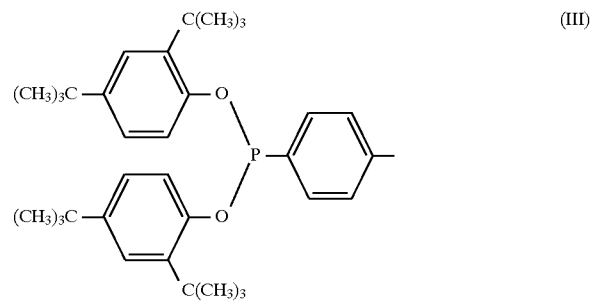

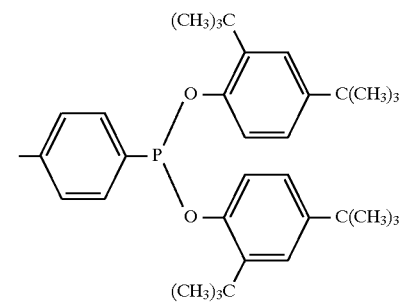

or mixtures of the phosphites II and the phosphonite III and c) one or more amines of the general formula IV

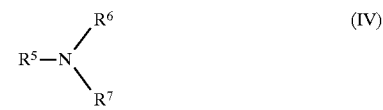

where the components (a) and (b) are present in the ratio of from 1:5 to 1:14 by weight and the component (c) is present in an amount of from 0.01 to 2.0% of the weight of (a)+(b) in the stabilizer mixture.

15 Claims, No Drawings

STABILIZER MIXTURE COMPOSED OF CHROMAN DERIVATIVES, ORGANIC PHOSPHITES OR PHOSPHONITES AND AMINES

This application is a 371 of PCT/EP95/00478 filed Feb. 10, 1995.

The present invention relates to a novel stabilizer mixture composed of chroman derivatives, organic phosphites or phosphonites and amines for stabilizing organic material, in particular plastics, against the action of light, oxygen and, in particular, heat.

DE-A 36 34 531 discloses stabilizer mixtures for stabilizing plastics composed of chroman derivatives (vitamin E, α-tocopherol) and organic phosphites or phosphonites. However, the mixtures have the disadvantage that they are unstable both on storage and after incorporation into the plastics. Probably owing to hydrolysis reactions in the presence of traces of moisture from the atmosphere, there is found to be a decrease in the content of chroman derivatives and thus a reduction in the stabilizing effect on the plastics.

It is an object of the present invention to provide a stable stabilizer mixture.

We have found that this object is achieved by a stabilizer mixture comprising (a) one or more chroman derivatives of the general formula I

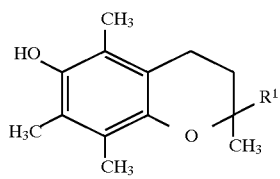

where $R^1$ is a group of the formula

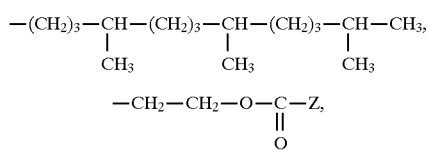

wherein Z is $C_7$–$C_{30}$-alkyl, preferably $C_{13}$-bis $C_{19}$-alkyl, —$CH_2CH_2$—S—($C_1$–$C_{30}$-alkyl), preferably —$CH_2CH_2$—S—($C_8$–$C_{20}$-alkyl), or

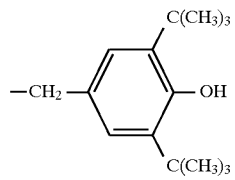

b) one or more organic phosphites of the general formula II

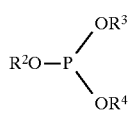

where $R^2$ to $R^4$ are each $C_2$–$C_{12}$-alkyl, preferably $C_6$–$C_{11}$-alkyl, in particular $C_8$–$C_{10}$-alkyl, or $C_6$–$C_{18}$-aryl, preferably phenyl, which can be substituted by $C_1$–$C_{18}$-alkyl groups, preferably one to three $C_4$–$C_{12}$-alkyl groups, or an organic phosphonite of the formula III

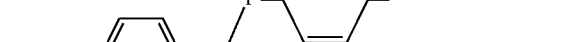
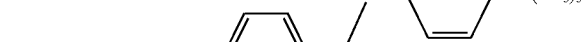
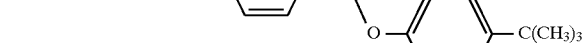

or mixtures of the phosphites II and the phosphonite III and
c) one or more amines of the general formula IV

where $R^5$ to $R^7$ in each case is hydrogen, is $C_1$–$C_{18}$-alkyl, which can be interrupted by up to 5 non-adjacent oxygen atoms or groups of the formula —$NR^8$— and can be substituted by up to 3 hydroxyl groups, where $R^8$ is hydrogen or $C_1$–$C_4$-alkyl, or is phenyl which can be substituted by up to 3 $C_4$–$C_{18}$-alkyl groups, with the exception of $NH_3$ as amine IV, where the components (a) and (b) are present in the ratio of from 1:5 to 1:14, preferably 1:6 to 1:10, by weight and the components [sic] (c) is present in an amount of from 0.01 to 2.0%, preferably 0.02 to 1.0%, in particular 0.03 to 0.5%, of the weight of (a)+(b) in the stabilizer mixture.

Particularly suitable chroman derivatives I are 2,5,7,8-tetramethyl-2-(2'-stearoyloxyethyl)chroman [sic] ($R^1$=—$CH_2CH_2$—O—CO—$C_{17}H_{35}$) and, in particular, α-tocopherols, preferably DL-α-tocopherol($R^1$=—($CH_2$)$_3$—CH($CH_3$)—($CH_2$)$_3$—CH($CH_3$)—($CH_2$)$_3$—C($CH_3$)$_2$).

The organic phosphites II which can be used according to the invention are both liquid and crystalline products. Examples of such phosphites which should be mentioned are:

trisalkyl [sic] phosphites with, preferably, long-chain linear or branched alkyl groups such as octyl, nonyl, isononyl, decyl or isodecyl groups;

triaryl phosphites with unsubstituted or mono- to trialkyl-substituted aryl groups such as phenyl, nonylphenyl or 2,4-di-tert-butylphenyl groups;

mixed aryl alkyl phosphites such as diisodecyl phenyl phosphite or diphenyl pentaerythritol diphosphite.

The phosphites of the formula II can be synthesized by known methods, for example by reaction of $PCl_3$ with monohydric or polyhydric alcohols in the presence of an organic base or with unsubstituted or substituted phenols without solvent at from 20° to 250° C. The mixed alkyl aryl phosphites are prepared, for example, by reacting triphenyl phosphite with monohydric or polyhyric alcohols in the presence of a basic catalyst, preferably without solvent.

The phosphonite III is known and is commercially obtainable under the name Irgafos® P-EPQ from Ciba-Geigy.

The amines IV which can be used according to the invention can be primary, secondary [lacuna], preferably, tertiary amines.

Examples which may be mentioned of such amines are: butylamine, dibutylamine, tributylamine, tripropylamine, triisopropylamine, octylamine, diisobutylamine or stearylamine.

Also preferred are amines which have $C_2$–$C_{18}$ radicals containing hydroxyl groups for $R^5$ to $R^7$, eg. ethanolamine, diethanolamine, triethanolamine, propanolamine, dipropanolamine, tripropanolamine, isopropanolamine, diisopropanolamine and, in particular, triisopropanolamine.

The amines IV ought, however, not to have too high a volatility, and therefore ammonia ($NH_3$) is unsuitable for the stabilizer mixture according to the invention.

The stabilizer mixture according to the invention is outstandingly suitable for stabilizing organic material against the action of light, oxygen and, in particular, heat. It is also effective as metal inactivator. It is added to the organic material to be stabilized in a concentration of from 0.05 to 5%, preferably from 0.01 to 2%, in particular from 0.05 to 1%, of the weight of the organic material, before, during or after its manufacture.

The stabilizer mixture according to the invention furthermore represents not only an excellent antioxidant, in particular for plastics, but also an effective dispersant for pigments in liquid colors.

Organic material means, for example, cosmetic products such as ointments and lotions, drug formulations such as pills and suppositories, photographic recording materials, in particular photographic emulsions, precursors for plastics and surface coatings or surface coatings themselves, but especially plastics themselves.

The present invention also relates to organic material stabilized against the action of light, oxygen and, in particular, heat, especially plastics, which contains the stabilizer mixture according to the invention in the concentrations stated above.

To mix the stabilizer mixture according to the invention in particular with plastics it is possible to use all known equipment and methods for mixing stabilizing agents or other additives into polymers.

The stabilizer mixture according to the invention can be used in particular for stabilizing plastics during processing thereof. Stabilizer mixtures of this type are added to plastics during or before the processing in order to protect the plastics from decomposition, it being known that different stabilizer systems may have additive effects.

Besides the stabilizer system according to the invention composed of components (a), (b) and (c), it is thus also possible to mix other stabilizer additives, eg. the synergists calcium stearate and distearyl thiodipropionate (S—($CH_2CH_2$—$COOC_{18}H_{37}$)$_2$) which are known for stabilizing purposes, in customary amounts into the plastics.

The described stabilizers can also be used together with plastics to produce concentrates, which can then be processed together with the plastics to be stabilized. Concentrates have advantages in the processing, depending on the area of application, because they are easier to handle and meter during the processing.

Examples of plastics which can be stabilized by the stabilizer mixture according to the invention are:

polymers of mono- and diolefins, eg. low or high density polyethylene, polypropylene, linear poly-1-butene, polyisoprene, polybutadiene and copolymers of mono- and diolefins or mixtures of said polymers;

polystyrene and copolymers of styrene or α-methylstyrene with dienes and/or acrylic derivates, eg. styrene/butadiene, styrene/acrylonitrile (SAN), styrene/ethylmethacrylate, styrene/butadiene/ethyl acrylate, styrene/acrylonitrile/methacrylate, acrylonitrile/butadiene/styrene (ABS) or methyl methacrylate/butadiene/styrene (MBS);

halogen-containing polymers, eg. polyvinyl chloride, polyvinyl fluoride, polyvinylidene fluoride and copolymers thereof;

polymers which are derived from α, β-unsaturated acids and derivatives thereof, such as polyacrylates, polymethacrylates, polyacrylamides and polyacrylonitriles;

polymers which are derived from unsaturated alcohols and amines or the acrylic derivatives or acetals thereof, eg. polyvinyl alcohol and polyvinyl acetate;

polyurethanes, polyamides, polyureas, polyphenylene ethers, polyesters, polycarbonates, polysulfones, polyether-sulfones and polyether-ketones.

Plastics which can be particularly well stabilized are thermoplastics such as polyvinyl chloride, styrene polymers, polyamides, polycarbonates, polyphenylene oxide, polyesters, polyolefins, preferably polyethylene and polypropylene, polyurethanes and thermosets.

Particularly important for the suitability and effectiveness of the stabilizer mixture according to the invention is, besides the slight intrinsic color and the processing stability, in particular the hydrolysis resistance and the stable content of chroman derivatives I.

Compared with the mixtures described in DE-A 36 34 531, the hydrolysis resistance, measured by the water uptake, is considerably improved. This will be illustrated by the following example.

EXAMPLE

The water uptake was determined on the 100% strength stabilizer mixture. The weight gain as a function of the storage time at a relative humidity of 98% and a temperature of 22° C. in the desiccator was determined.

| | |
|---|---|
| Mixture 1 (according to the invention) | 1 part by weight of D,L-α-tocopherol, 10 parts by weight of trisnonylphenyl phosphite, 0.05 part by weight of triisopropanolamine |
| Mixture 2 (for comparison disclosed in DE-A 36 34 531) | 1 part by weight of D,L-α-tocopherol, 10 parts by weight of trisnonylphenyl phosphite |

The results are shown in the following table.

| | Water uptake in % by weight after | | | | |
|---|---|---|---|---|---|
| Mixture No. | 0 | 5 | 10 days | 15 | 20 |
| 1 | 0 | 0.05 | 0.08 | 0.10 | 0.11 |
| 2 | 0 | 2.50 | 3.20 | 5.40 | 8.80 |

We claim:

1. A stabilizer mixture comprising (a) one or more chroman derivatives of the general formula I

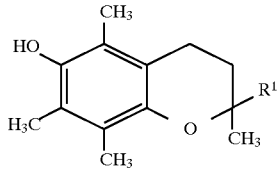

where $R^1$ is a group of the formula

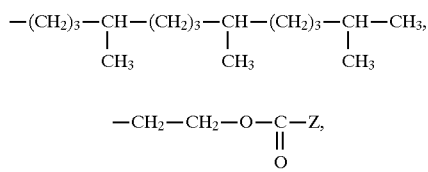

$$-CH_2-CH_2-O-\overset{\underset{\displaystyle O}{\|}}{C}-Z,$$

where Z is $C_7$–$C_{30}$-alkyl, $-CH_2CH_2-S-(C_1-C_{30}$-alkyl), or

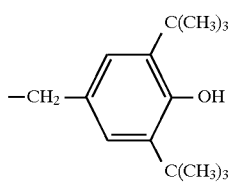

(b) one or more organic phosphites of the general formula II

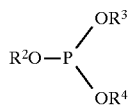

where $R^2$ to $R^4$ are each $C_2$–$C_{12}$-alkyl, or $C_6$–$C_{18}$-aryl optionally substituted by $C_1$–$C_{18}$-alkyl groups, or an organic phosphonite of the formula III

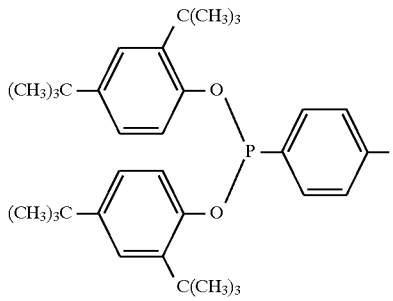

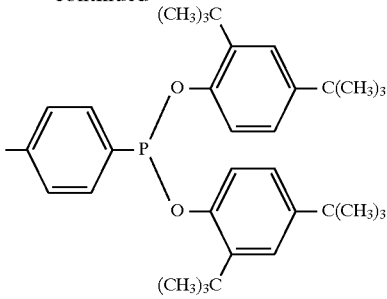

or mixtures of the phosphites II and the phosphonite III and c) one or more amines of the general formula IV

where $R^5$ to $R^7$ in each case is hydrogen, is $C_1$–$C_{18}$-alkyl, optionally interrupted by up to 5 non-adjacent oxygen atoms or groups of the formula $-NR^8-$ and optionally substituted by up to 3 hydroxyl groups, where $R^8$ is hydrogen or $C_1$–$C_4$-alkyl, or is phenyl optionally substituted by up to 3 $C_4$–$C_{18}$-alkyl groups, with the exception of $NH_3$ as amine IV, where the components (a) and (b) are present in the ratio of from 1:5 to 1:14 by weight and the component (c) is present in an amount of from 0.01 to 2.0% of the weight of (a)+(b) in the stabilizer mixture.

2. A stabilizer mixture as claimed in claim 1, wherein tertiary amines are used as component (c).

3. A stabilizer mixture as claimed in claim 1, wherein primary, secondary or tertiary amines with $C_2$–$C_{18}$-alkyl radicals containing hydroxyl groups for $R^5$ to $R^7$ are used as component (c).

4. A process for stabilizing an organic material, comprising:
mixing an organic material and the stabilizer of claim 1, thereby stabilizing said organic material against the action of light, oxygen and heat.

5. A process for stabilizing an organic material, comprising:
mixing an organic material and the stabilizer of claim 2, thereby stabilizing said organic material against the action of light, oxygen and heat.

6. A process for stabilizing an organic material, comprising:
mixing an organic material and the stabilizer of claim 3, thereby stabilizing said organic material against the action of light, oxygen and heat.

7. A process for stabilizing a plastic, comprising:
mixing a plastic and the stabilizer of claim 1, thereby stabilizing said plastic against the action of light, oxygen and heat.

8. A process for stabilizing a plastic, comprising:
mixing a plastic and the stabilizer of claim 2, thereby stabilizing said plastic against the action of light, oxygen and heat.

9. A process for stabilizing a plastic, comprising:
mixing a plastic and the stabilizer of claim 3, thereby stabilizing said plastic against the action of light, oxygen and heat.

10. An organic material which is stabilized against the action of light, oxygen and heat, comprising:

an organic material, and 0.005 to 5.0% by weight, based on the amount of said organic material, of the stabilizer mixture of claim 1.

11. An organic material which is stabilized against the action of light, oxygen and heat, comprising:

an organic material, and 0.005 to 5.0% by weight, based on the amount of said organic material, of the stabilizer mixture of claim 2.

12. An organic material which is stabilized against the action of light, oxygen and heat, comprising:

an organic material, and 0.005 to 5.0% by weight, based on the amount of said organic material, of the stabilizer mixture of claim 3.

13. A plastic which is stabilized against the action of light, oxygen and heat, comprising:

a plastic, and 0.005 to 5.0% by weight, based on the amount of said plastic, of the stabilizer mixture of claim 1.

14. A plastic which is stabilized against the action of light, oxygen and heat, comprising:

a plastic, and 0.005 to 5.0% by weight, based on the amount of said plastic, of the stabilizer mixture of claim 2.

15. A plastic which is stabilized against the action of light, oxygen and heat, comprising:

a plastic, and 0.005 to 5.0% by weight, based on the amount of said plastic, of the stabilizer mixture of claim 3.

* * * * *